J. Old,

Grate.

No. 4,042. Reissued June 21. 1870

Witnesses.
Thos. B. Odell
R. C. Wrenshall

Inventor.
James Old
by Bakewell & Christy
his Attys

N. PETERS, PHOTO-LITHOGRAPHER, WASHINGTON, D. C.

United States Patent Office.

JAMES OLD, OF PITTSBURG, PENNSYLVANIA.

*Letters Patent No.* 87,790, *dated March* 16, 1869; *reissue No.* 4,042, *dated June* 21, 1870.

GRATE.

The Schedule referred to in these Letters Patent and making part of the same.

*To all whom it may concern:*

Be it known that I, JAMES OLD, of the city of Pittsburg, in the county of Allegheny and State of Pennsylvania, have invented a new and useful Improvement in Grates; and I do hereby declare the following to be a full, clear, and exact description thereof, reference being had to the accompanying drawing making a part of this specification, in which—

Like letters of reference indicate like parts in each.

Figure 1:
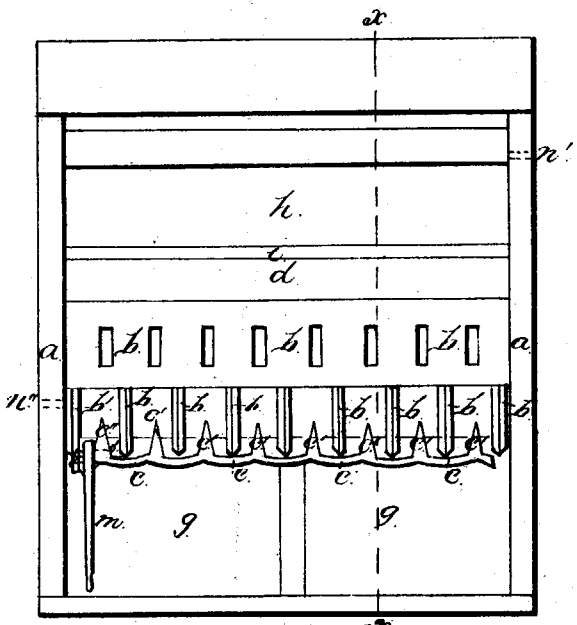
Figure 1 is a front elevation of my improved grate and fire-place.

My invention relates to an improved construction of fire-place and grate; and consists in closing the under side of a grate with a rocking or tipping damper-plate, furnished with projecting agitators which play upward between the grate-bars, to stir the fire and disengage the ashes, and also furnished with devices for operating the same; also, in attaching between the rear part of the grate and the back wall, a lifting-bar, by which to stir the fire in that part of the grate, and open apertures for the admission of air thereto; and lastly, in so constructing the rear wall and cover-plate of the fire-space as to heat the air passing up an open chamber in the rear of the fire, and discharge it into the fire-space beneath the cover plate, which latter extends forward over the fire-space.

Devices of the character referred to are not only desirable but very necessary in burning the soft or bituminous coal, which, in many localities, is almost the only available means of fuel.

To enable others skilled in the art to make and use my invention, I will proceed to describe its construction and manner of use.

*a a* represent the side, and *a'* the rear walls of a fire-place, furnace, or stove, of any usual or known construction.

The grate or fire-basket *b* is also of the ordinary construction, and is supported by the side walls in the usual way, but it does not extend quite to the back wall of the fire-chamber.

Along under the bottom of the grate *b* extends the damper-plate *c*, and from this the agitators *c'* extend upward between the grate-bars *b*.

From either end of this plate *c*, or at any other desirable points, the levers *e* extend back, are pivoted to the rear part of the grate *b*, and, by their rear ends, support a lifting-bar, *e'*.

This lifting-bar *e'* closes the aperture between the rear part of the grate and the back wall *d* of the fire-space.

This back wall *d* is usually a single slab or tile, made of fire-clay, and is so placed as to leave between it and the rear wall *a'* of the fire-place an open chamber, *f*, leading from the ash-pit *g*.

Another slab or tile, *h*, inclining forward from the rear wall *a'* toward the front of the fire-place, constitutes the roof of the fire-space.

Between the roof-tile *h* (which extends to the back wall *a'*) and the back tile *d*, is left a throat, *i*, which extends along nearly or quite the entire length of the fire-space, and through which the air from the ash-pit *g*, heated by passing along the rear face of the tile *d*, is discharged into the fire-space under the covering-tile *h*, and at such point that, being deflected forward by the tile *h* overhead, it comes into most intimate contact with the smoke, unconsumed carbon, &c., which is given off in considerable quantities from bituminous coal, and which smoke, &c., would otherwise deposit on the tile *h*, and prevent the radiation of heat therefrom, or pass up the throat *l* into the chimney and be wasted.

The oxygen of the air thus fed in is deflected forward by the tile *h*, so as to unite with and ignite the waste given off by the fire, thus evolving increased light and heat, and keeping the lower face of the tile *h* free from deposits of carbon, and preserving its power of a radiator of heat, as well as effecting a considerable saving of fuel. The construction also gives a perfectly-operating dust-flue, and such devices are applicable to any fire place, and are a complete cure of dusty fire-places.

Figure 4:
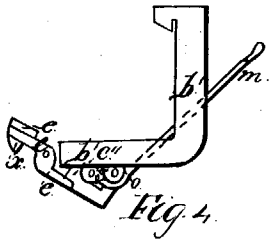
Figures 3 and 4 are end views of the grate with devices attached for stirring the fire, and showing the same in different positions.
Figure 3:
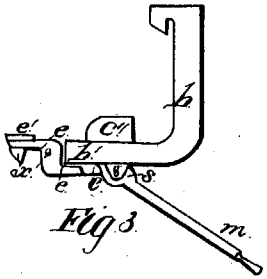
Figure 2:
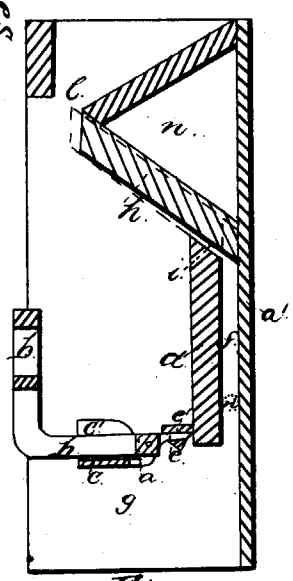
Figure 2 is a vertical section, *x x*, fig. 1.

In order to operate the agitators *c'* and tipping-bar *e'*, I use a device particularly shown in figs. 3 and 4.

The lever *m* has a head, *s*, pivoted at one point to a lug, *o*, projecting from one of the bars *b*, and at another point has a wrist, *o'*, passing through a slot in one of the agitators *c''*, figs. 1 and 4.

By raising the lever *m*, as in fig. 4, the wrist *o'* passes to the rear of the slot in the agitator *c''* depresses the damper-plate *b*, elevates the lifting-bar *e'*, loosens up the fuel in the back part of the grate, and opens the whole bottom and rear part of the grate to the admission of air.

Combustion is consequently kept up in the rear part of the fire-space next the tile *d*, by which the latter is heated, a uniform fire kept up throughout the fire-space, and, consequently, more heat secured from a fire-grate of any given size.

By moving the lever up and down a few times, the fuel in the grate is well shaken up, and the ashes fall out into the ash-pit *g*.

If the fire be too great, the lever *m* is lowered, as shown in fig. 3, and then the plate *c* cuts off the supply of air under the grate, and the lifting-bar *e* closes the vent in the rear.

On the under side of the lifting-bar *e'* I make a series of projections, *x*, which, when the bar is tilted up, act, like grate-bars, to prevent the fuel from falling through the aperture thus formed between the bar *e'* and tile *d*.

By the use of such devices, when desired, a complete combustion of the fuel can be secured throughout the fire-basket with the evolution of the maximum of heat; or, by merely shifting a lever, the grate can be so completely shut up that combustion will be at once and almost entirely arrested, and the fire kept from either expiring or burning out for a considerable time.

The centers of motion *o* and *o'*, and the slot in the agitator *b'*, are so related to each other that the lever *m* locks the devices either open or shut, as the case may be.

It will be observed that, with the construction and mode of operation described, the agitators *c'* are removed from the fire when a vivid combustion is required, whereby they are preserved from the destructive action of the fire thereon, and in this respect they differ from other devices already in use for the same purpose.

What I claim as my invention, and desire to secure by Letters Patent, is—

1. A tilting damper-plate, *c*, with agitators *c'* on its upper face, which extend up and operate between the bars *b*, in combination with a lever, *m*, and head *s*, so connected, by a wrist and slot, with such damper-plate, as to lock it open or shut, or vibrate it at pleasure, substantially as and for the purposes above set forth.

2. A lifting-bar, *e*, pivoted between the rear part of a fire-grate and the back wall of the fire-space, for regulating the combustion in the rear part of the fire, constructed and operating substantially as and for the purposes hereinbefore set forth.

3. A dust and air-flue, *f*, extending up from the ash-pit *g* back of the rear tile *d*, and opening by a throat, *i*, into the upper part of the fire-space, under a covering-tile or plate, *h*, such covering-plate extending forward over the fire-space, so as to bring the hot air from the flue *f* into close contact with the smoke and gases of combustion, and effect their more perfect ignition, substantially as described.

In witness whereof, I, the said JAMES OLD, have hereunto set my hand.

JAMES OLD.

Witnesses:
JOHN GLENN,
THOS. B. KERR.